Jan. 14, 1936.  F. ROTH  2,027,841
HAM BOILER
Filed Oct. 8, 1932
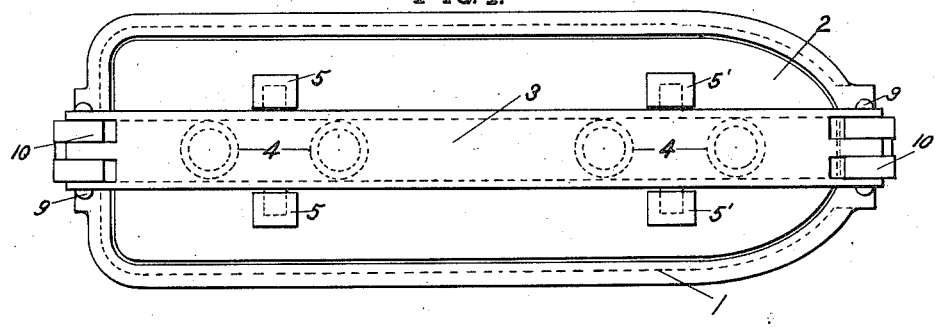
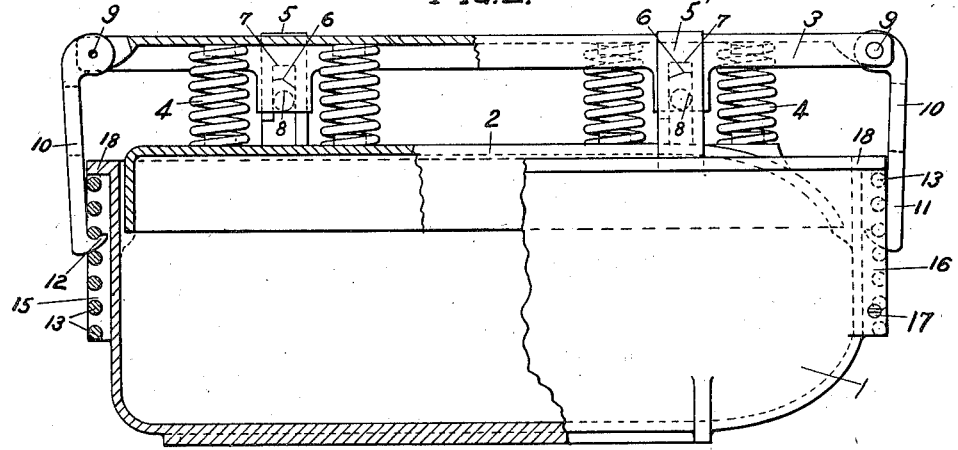
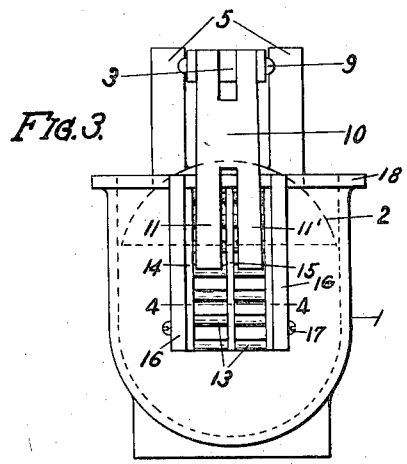
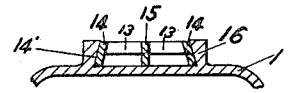
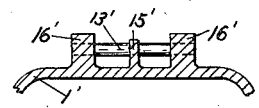
INVENTOR.
FRANK ROTH
BY Miller Boykey & Bried
ATTORNEYS.

Patented Jan. 14, 1936

2,027,841

UNITED STATES PATENT OFFICE 2,027,841

HAM-BOILER

Frank Roth, San Francisco, Calif.

Application October 8, 1932, Serial No. 636,824

7 Claims. (Cl. 100—57)

This invention relates to ham boilers, cookers, or the like, for forming ham or meat loaves by pressure and cooking.

The objects of the invention are to provide a cooker which is highly efficient, easily handled, simple and strong in structure and less susceptible to breakage than in cookers heretofore. Other objects will appear in the specification.

In the drawing accompanying this application Fig. 1 is a plan view of my cooker assembled. Fig. 2 is a side elevation of the cooker with a portion in section. Fig. 3 is an end view of the cooker. Fig. 4 is a fragmentary sectional view taken along the line 4—4 of Fig. 3. Fig. 5 is another form of the portion shown in Fig. 4.

The body 1 of the cooker is preferably of cast aluminum in the form of a relatively deep, elongated pan with two opposite end walls flattened and an open top. Cast on the underside of the bottom are ribs which act as a base to support the pan, such ribs being conventional in cookers of this type.

A cover 2 is provided, which is also of cast aluminum, and is of a shape and size to telescopically fit within the body 1. A bar 3 extends longitudinally above the cover with a plurality of vertical coil springs 4 interposed between the bar and the cover along the bar.

The bar is retained in position on the cover between two pairs of upwardly extending guides 5, 5', respectively, adjacent opposite ends of the bar, said guides being integral with the cover 2. Each pair of guides are formed with oppositely facing channels 6 and closed upper ends 7 and lugs 8 extending outwardly from opposite lateral sides of bar 3 are adapted to extend into the channels, and the springs 4 normally force the lugs and consequently bar 3 adjacent the upper ends of the guides, though the bar is free to be forced downwardly to yieldably force the cover 2 against a meat loaf or other material placed in the cooker body.

Pivoted at an end each of the bar 3 at 9 are members 10 which are adapted to swing in a vertical plane from a vertical to a depending position over the ends of the body 1. These members are each bifurcated at their outer ends to form duplicate arms 11, 11' as best seen in Fig. 3, and these arms are each formed with hooks 12 at their outer ends on the side thereof adjacent to flattened ends of the body 1. On the flattened ends of the body respectively are vertically disposed racks of bronze or other metal of similar strength and hardness, which racks resemble grills in appearance, each having horizontally extending bars or ribs 13 connected at their ends by vertical runs 14 and a centrally disposed vertical rib 15, thus providing two distinct vertically disposed rows of spaced bars which are adapted to be engaged by the hooks at the ends of members 10 at various positions as the bar 3 is depressed and the cover yieldably forced against the material in the body 1, compressing the coil springs 4 which are interposed between the cover 2 and bar 3.

The racks at the ends of the body 1 are each retained in position between spaced vertically extending ribs 16 formed on the opposite ends respectively of the body 1, the opposed surfaces of these ribs being slightly undercut and the outer edges of the vertical runs 14 of the racks being beveled to fit as at 14', so the racks cannot be pulled away from the body. Set screws 17 may also be provided if desired. The body 1 has an outwardly extending flange 18 around its upper edge which stops the racks from being pulled upward out of the ways in which they are fitted. This flange extends outwardly substantially the same distance as the ribs 16 and the outer surfaces of the racks are substantially flush with the outer surfaces of the ribs 16 and flange 18; hence there are no projecting teeth to be engaged by the hooks on arms 11, 11' to be broken off, or interfere with the close packing of the cookers in a larger container for cooking the loaves.

This structure of the racks in combination with the body is a very important feature of my invention, since large numbers of cookers are rendered worthless each year by the breaking off of somewhat similar portions of the cookers. Also the provision of two spaced hooks on a single member 10 is quite an advantage since it provides for engagement of an appreciable area by the hooks and yet compensates for any uneven pressures against the cover, which pressures are, of course, transmitted to one side of the hooks or the other according to where the pressure is greatest.

It is also to be noted that the bars 13 of the racks at the ends of the body are spaced from the body of the cooker, as best seen in Fig. 4 of the drawing, so that the points of the hooks on members 10 are not in contact with anything, the strain being placed in the angle of the hook where the strength is greatest.

The use of bronze racks instead of racks being cast integral with the body of the cooker is also a very valuable feature, since racks of aluminum will not stand the strain of hooks, but are easily broken and the cookers rendered useless; yet the use of any other material for the cooker body would be impractical due to the fact that the time of heating and cooling of the cookers must be very rapid, and other materials would be too slow for successful operation.

In my cooker, by the use of bronze racks in combination with an aluminum body, the racks are practically indestructible and the efficiency of the cooker is the same as if it were all of aluminum, and the racks are easily and quickly replaceable in case of any damage thereto, and the body itself is thus saved where otherwise the entire body is worthless.

It is also apparent that in the rack construction, the bars 13 may be separate as indicated at 13' in Fig. 5, and the two end vertical ribs designated 16' in this figure are substantially the same as ribs 16 in Fig. 4, being cast integrally with the container eliminating the ribs 14 of the previously described rack. A central rib 15' in the modified form is also cast integral with the container and cross rods 13' are inserted through transverse openings drilled through the ribs 15', 16', all as clearly indicated in the drawing. Applicant does not wish to be limited to the use of round ribs as disclosed in the drawing, but finds that the absence of sharp outwardly and downwardly projecting teeth as formerly used, are subject to excessive breakage due to the weakness at the outer ends thereof, and the unequal distribution of the strain imposed thereon, as well as the susceptibility of the ends being broken by being struck by external objects.

Having described my invention, I claim:

1. In a ham cooker of the type having a container for the meat and a lid fitting within the container provided with hooks at the ends arranged for hooking to the container for clamping the lid down upon the meat, the improvement which comprises providing a pair of spaced vertical ribs projecting on the outside of the two opposite ends of the container respectively, a separable rack member provided with a plurality of spaced horizontally extending bars positioned between each pair of said ribs, and means securing said rack-members in place, said bars of the rack members being adapted for selective engagement by the hooks of the lid.

2. In a ham cooker of the type having a container for the meat and a lid fitting within the container provided with hooks at the ends arranged for hooking to the container for clamping the lid down upon the meat, the improvement which comprises providing a pair of spaced vertical ribs projecting on the outside of the two opposite ends of the container respectively, a separable rack member provided with a plurality of spaced horizontally extending bars positioned between each pair of said ribs, and means securing said rack-members in place, said bars of the rack members being adapted for selective engagement by the hooks of the lid, and the outer surface of said rack-members arranged substantially flush with the outer surface of said ribs.

3. In a ham cooker of the type having a container for the meat and a lid fitting within the container provided with hooks at the ends arranged for hooking to the container for clamping the lid down upon the meat, the improvement which comprises providing a pair of spaced vertical ribs projecting on the outside of the two opposite ends of the container respectively, a separable rack member provided with a plurality of spaced horizontally extending bars positioned between each pair of said ribs, means securing said rack-members in place, said bars of the rack members being adapted for selective engagement by the hooks of the lid, and an outwardly projecting flange on the upper edge of the container extending over and joining the ribs preventing accidental upward displacement of the rack-members disposed between the ribs.

4. In a ham cooker of the type having a container for the meat and a lid fitting within the container provided with hooks at the ends arranged for hooking to the container for clamping the lid down upon the meat, the improvement which comprises providing a pair of separate rack-members at the outer opposite ends of the container adapted for engagement by the hooks of the lid respectively, means formed integrally with the container positioning said rack-members against lateral and upward displacement, and means securing the rack-members to the ends of the container.

5. In a ham cooker of the type having a container for the meat and a lid fitting within the container provided with hooks at the ends arranged for hooking to the container for clamping the lid down upon the meat, the improvement which comprises providing a pair of separate rack-members at the outer opposite ends of the container adapted for engagement by the hooks of the lid respectively, means formed integrally with the container positioning said rack-members against lateral and upward displacement, and means securing the rack-members to the ends of the container, said rack-members comprising each a plurality of spaced horizontally extending bars.

6. In a ham cooker of the type having a container for the heat and a lid fitting within the container provided with hooks at the ends arranged for hooking to the container for clamping the lid down upon the meat, the improvement which comprises providing a pair of rack-members at the outer opposite ends of the container each comprising a plurality of spaced horizontally extending bars secured between vertical ribs, said bars being adapted for selective engagement by the hooks of the lid.

7. In a ham cooker of the type having a container for the meat and a lid fitting within the container, a pair of spaced members cast integrally with the container at its opposite ends and projecting outwardly from the outer surfaces of the ends, means for securing the lid to the container at various points of elevation of the lid within the container including a pair of devices at each end of the cooker, one of each pair of devices being secured to the container and the other being secured to the container lid, one device of each of said pairs of devices comprising a rack formed of spaced vertically disposed side pieces having a vertical row of spaced horizontally extending bars secured between the side pieces and the other device of the pair comprising a hook formed and adapted to successively engage the bars of the rack, means removably securing one of each of said pairs of devices to the container adapted to closely receive one of each of said pairs of devices therebetween.

FRANK ROTH.